(12) United States Patent
Sievert

(10) Patent No.: US 6,912,541 B1
(45) Date of Patent: Jun. 28, 2005

(54) METHOD AND APPARATUS FOR IMPLEMENTING PERSISTENT DATA IN OBJECT ORIENTED PROGRAMS

(75) Inventor: James A. Sievert, Lino Lakes, MN (US)

(73) Assignee: Unisys Corporation, Blue Bell, PA (US)

(*) Notice: Subject to any disclaimer, the term of this patent is extended or adjusted under 35 U.S.C. 154(b) by 904 days.

(21) Appl. No.: 09/727,612

(22) Filed: Dec. 1, 2000

(51) Int. Cl.$^7$ .............................................. G06F 17/00
(52) U.S. Cl. ................... 707/103 R; 719/310; 717/116; 717/140
(58) Field of Search .................. 707/103 R, 103 Y, 707/103 Z, 103, 1–10; 719/310, 315, 316; 717/100–167

(56) References Cited

U.S. PATENT DOCUMENTS

| | | | | |
|---|---|---|---|---|
| 5,161,225 A | * | 11/1992 | Abraham et al. | 707/103 R |
| 5,870,742 A | * | 2/1999 | Chang et al. | 707/8 |
| 6,096,095 A | * | 8/2000 | Halstead | 717/107 |
| 6,275,828 B1 | * | 8/2001 | Lee et al. | 717/116 |
| 6,330,709 B1 | * | 12/2001 | Johnson et al. | 717/100 |
| 6,505,211 B1 | * | 1/2003 | Dessloch et al. | 707/103 Y |
| 6,668,257 B1 | * | 12/2003 | Greef et al. | 707/102 |
| 6,769,124 B1 | * | 7/2004 | Schoening et al. | 719/316 |
| 6,799,301 B1 | * | 9/2004 | Francis et al. | 715/523 |

OTHER PUBLICATIONS

Booch, Grady. "Object Oriented Design with Applications." Benjamin/Cummings Publishing Company, Inc. 1991. pp. 163–167 and 302–304.*

Meyer, Bertrand. "Object Oriented Software Construction." Prentice Hall International, Ltd. 1988. pp. 349–352 and 446–447.*

* cited by examiner

Primary Examiner—Lewis A. Bullock, Jr.
(74) Attorney, Agent, or Firm—Mark T. Starr; Charles A. Johnson; LeRoy Maunu

(57) ABSTRACT

Method and apparatus for implementing persistent data in object-oriented programs. A class declaration is separated into two parts, a first structure type for storage of one or more data values, and a class that derives from the structure type. Objects of the structure type are instantiated and initialized in the source program. The class definition includes a static method that converts an object of the structure type to an instance of the class in response to a reference to the method. Thereby, memory for the objects is allocated and data values are assigned to the objects at compile-time.

16 Claims, 10 Drawing Sheets

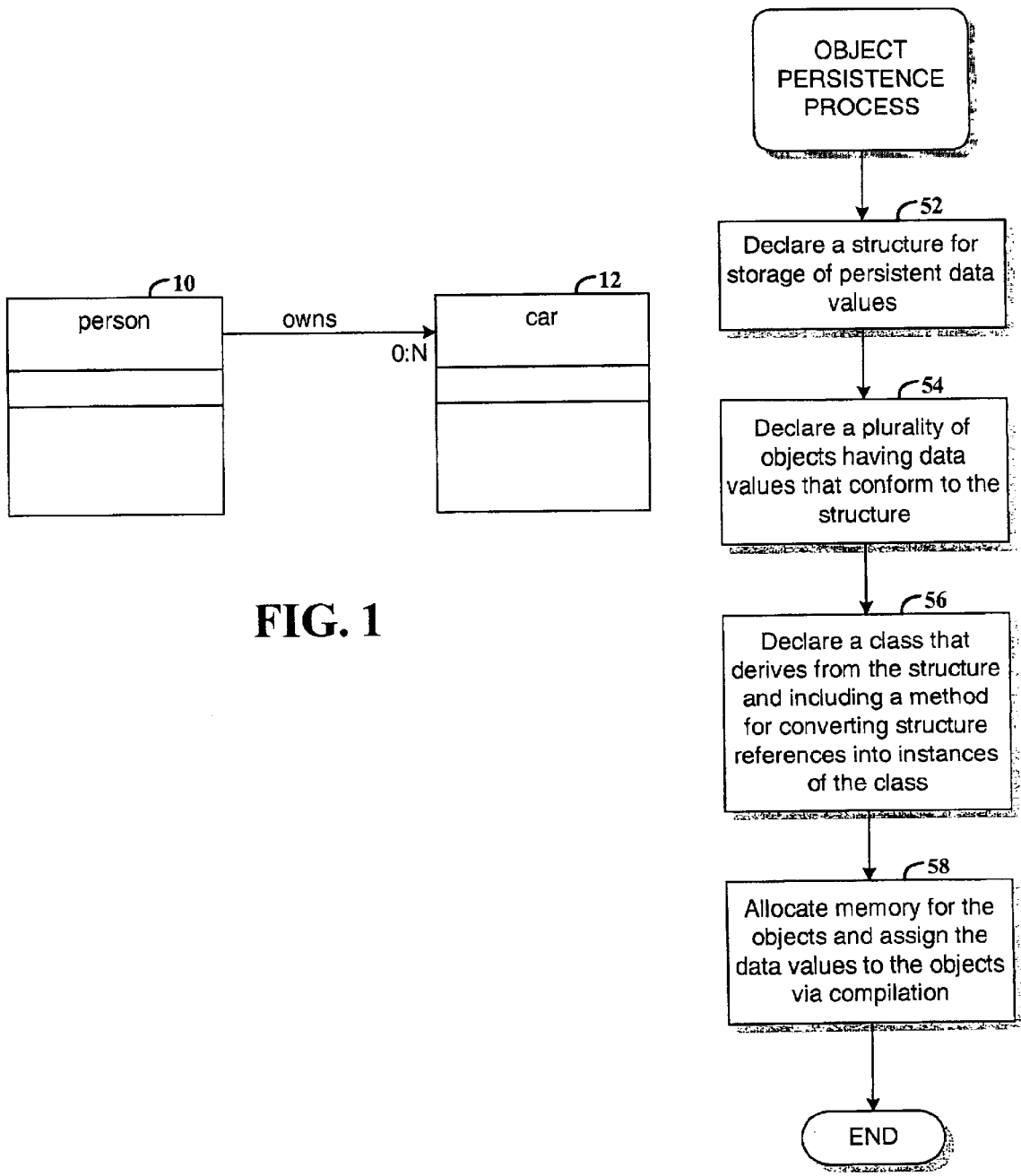

```
                                                    ┌─102
                              example
                             structure
         struct SPerson
         {
            char *m_name;
            unsigned long m_dob;
         };
```

FIG. 3

```
                                                    ┌─104
                                           example
                                            class
         class CPerson : private SPerson
         {
         public:
            static CPerson &convertTo( SPerson &from )
            {
               return static_cast< CPerson & >( from );
            }
         };
```

FIG. 4

```
                                                    ┌─106
         {
            ...                             example
            SPerson myData =                 code
            {
               "John Smith",
               19620612
            }

CPerson &me = CPerson::convertTo( myData );
            ...
         }
```

FIG. 5

```
class CPersonTraits
{
public:                                example
  typedef CPerson type;                traits
  typedef SPerson data;
  typedef SPerson base;
};

class CCarTraits
{
public:
  typedef CCar type;
  typedef SCar data;
  typedef SCar base;
};

struct SCar
{
  char *m_make;
  char *m_model;
  CPersonTraits::data *m_owner;
};

class CPerson : private CPersonTraits::base
{
public:
  typedef CPersonTraits traits;

static traits::type &convertTo( traits::data &from )
  {
    return static_cast< traits::type & >( from );
  }
};

class CCar : private CCarTraits::base
  {
  public:
    typedef CCarTraits traits;

static traits::type &convertTo( traits::data &from )
    {
      return static_cast< traits::type & >( from );
    }

CPerson &owner()
    {
      return CPerson::convertTo( *m_owner );
    }
  };
```

FIG. 6

```
                                              ┌─110
                                    example
                                   collection
template< class CollectionTraits >
struct SStructCollection
{
   unsigned int m_size;
   CollectionTraits::collectionData *m_first;
};
```

FIG. 7

```
                                                              ┌─112 template< class TypeTraits, class Initializer = CNullStructCollectionInitializer<
TypeTraits > >
class CStructCollectionTraits
{
public:
   typedef TypeTraits::data collectionData;
   typedef TypeTraits::type collectionType;

typedef CStructCollection< CStructCollectionTraits< TypeTraits, Initializer >
         > type;
   typedef SStructCollection< CStructCollectionTraits< TypeTraits, Initializer >
         > base;
   typedef SStructCollection< CStructCollectionTraits< TypeTraits, Initializer >
         > data;

typedef CCollectionIterator< TypeTraits > iterator;

typedef Initializer initializer;
};
```

FIG. 8

*example collection iterator*

```
template< class TypeTraits >
class CCollectionIterator
{
public:
   typedef TypeTraits::data data;
   typedef TypeTraits::type type;

CCollectionIterator( data *begin ) : m_p( begin ) {}
   CCollectionIterator( const CCollectionIterator< TypeTraits > &from ) : m_p(
                    from.m_p ) {}
   CCollectionIterator &operator =( const CCollectionIterator< TypeTraits >
                                   &from )
   {
     m_p = from.m_p;

return *this;
   }
   ~CCollectionIterator() {} type *operator ->()
   {
     return &type::convertTo( *m_p );
   } type &operator *()
   {
     return type::convertTo( *m_p );
   }

CCollectionIterator< TypeTraits > &operator ++()
   {
     ++m_p;

return *this;
   }
```

FIG. 9A

```
                                                        ┌─116
                                          example
                                          collection
                                          iterator
   data *pointer()
   {
      return m_p;
   }

CCollectionIterator< TypeTraits > operator +( int addend ) const
   {
      return m_p + addend;
   }

CCollectionIterator< TypeTraits > operator -( int addend ) const
   {
      return m_p - addend;
   } bool operator !=( const CCollectionIterator< TypeTraits > &to ) const
   {
      return m_p != to.m_p;
   } bool operator <( const CCollectionIterator< TypeTraits > &to ) const
   {
      return m_p < to.m_p;
   }
 private:
   data *m_p;
};
```

FIG. 9B

```
template< class TypeTraits >                    example
class CStructCollectionInitializer              collection
{                                               initializer
public:
  typedef TypeTraits::collection collection;

inline CStructCollectionInitializer( collection::traits::data &collectionData )
    :
    m_collection( collection::convertTo( collectionData ) )
  {
    for ( collection::traits::iterator i = m_collection.begin(); i < m_collection.end();
        ++i )
    {
      new( i.pointer() ) TypeTraits::type;
    }
  } inline ~CStructCollectionInitializer()
  {
    for ( collection::traits::iterator i = m_collection.begin(); i < m_collection.end();
        ++i )
    {
      typedef collection::traits::collectionType collectionType;

i->collectionType::~collectionType();
    }
  }
private:
  collection &m_collection;
};
```

FIG. 10

*example pre-processor macro*

```
#define COLLECTION_BEGIN( TypeTraits, CollectionName ) \
TypeTraits::data CollectionName##Collection[] = \
{ define COLLECTION_END( TypeTraits, CollectionName ) \
}; \
TypeTraits::collection::traits::data CollectionName = \
{ \
   sizeof( CollectionName##Collection) / sizeof( TypeTraits::data ), \
   CollectionName##Collection \
}; \
TypeTraits::collection::traits::initializer CollectionName##Initializer(
         CollectionName );
```

FIG. 11

*example pre-processor forward referencing macro*

```
#define COLLECTION_FORWARD( TypeTraits, CollectionName ) \
TypeTraits::data CollectionName##Collection[];
```

FIG. 12

```
#define ENTRY_REF( CollectionName, Element ) \
&CollectionName##Collection[ ( Element ) ]
```

*example pre-processor inter-collection reference macro*

FIG. 13

```
#define COLLECTION_NO_ENTRIES( TypeTraits, CollectionName ) \
TypeTraits::collection::traits::data CollectionName = { 0, 0 };
```

*example pre-processor empty collection macro*

FIG. 14

```
template< class TypeTraits, unsigned int N = 1
>
struct SVirtualSupport
{
  struct
  {
    void *m_vptrs[ N ];
    TypeTraits::base m_data;
  };
  void ( *m_initializer )( void *where );
};
```

*example aggregate supporting virtual data members*

FIG. 15A

```
template< class TypeTraits >          example
class CInstanceInitializer            vfpointer
{                                     initialization
public:
   static void initialize( void *where )
   {
      new( where ) TypeTraits::type;
   }
};
```

FIG. 15B

```
                                      example
                                      vfpointer
                                      initialization
class CCarTraits
{
public:
   typedef CCar type;
   typedef SVirtualSupport< CCarTraits > data;
   typedef SCar base;
   typedef CInstanceInitializer< CCarTraits > initializer;
};
```

FIG. 15C

```
                                      example
{                                     vfpointer
   ...                                initialization
   CCar::traits::data carData =
   {
      { { 0 }, { "Ford", "Escort", &personCollection[ 0 ] }, CCarTraits::initializer }
   };

( *carData.m_initializer )( carData );   // initialize car instance.

CCar &car = CCar::convertTo( carData );  // produce a real CCar instance
                                            // from the already initialized data.
   ...
}
```

FIG. 15D

METHOD AND APPARATUS FOR IMPLEMENTING PERSISTENT DATA IN OBJECT ORIENTED PROGRAMS

FIELD OF THE INVENTION

The present invention generally relates to object oriented programming techniques and more particularly to implementing persistent data in an object oriented program.

BACKGROUND OF THE INVENTION

Object persistence is often viewed by software developers as a raw data stream containing information from which objects can be instantiated and loaded with state. In embedded applications, it is useful to hard-code object persistence. Hard-coded object persistence refers to the coding of objects and their state directly into an executable unit. Such an object persistence scheme is useful when an application has large amounts of pre-configured objects, where the performance of object creation and state loading is critical. In Visual C++, the optimization required to realize the performance of hard-coded objects is not implemented within the compiler.

Typical object persistence models suffer from a number of performance weaknesses. First, the necessity of factory functions generally dictates the use of dynamic allocation of objects through operator new( ). Heap management routines may be slow and unreliable. Furthermore, locality of reference issues may result in poor performance. Second, objects must assign attribute values read from a persistent data stream. Reading data from a data stream not only consumes execution time, but also results in excess program code. Finally, pointers to objects that have yet to be created must be resolved following their creation.

A method and apparatus that addresses the aforementioned problems, as well as other related problems, are therefore desirable.

SUMMARY OF THE INVENTION

In various embodiments, the invention provides a method and apparatus for implementing persistent data in object-oriented programs. In one embodiment, a class declaration is separated into two parts, a first structure type for storage of one or more data values, and a class that derives from the structure type. Objects of the structure type are instantiated and initialized in the source program. The class definition includes a static method that converts an object of the structure type to an instance of the class in response to a reference to the method. Thereby, memory for the objects is allocated and data values are assigned to the objects at compile-time.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 1 is an object model diagram illustrating a relationship between a person and the cars owned by a given person;

FIG. 2 is a flowchart of a process for persisting data in objects in accordance with one embodiment of the invention;

FIG. 3 has a code segment declares a SPerson structure;

FIG. 4 has a code segment that declares an example CPerson class;

FIG. 5 has example code segment 106 that assigns data values to an object named myData of the SPerson structure type;

FIG. 6 has program code that implements example traits;

FIG. 7 has program code that declares an example collection;

FIG. 8 has program code that implements a trait collection;

FIGS. 9A and 9B together include code that implements an example collection iterator;

FIG. 10 includes example code for an initializer called CStructCollectionInitializer;

FIG. 11 has example code that uses preprocessor macros for collection generation;

FIG. 12 includes example code that implements forward referencing for a collection;

FIG. 13 includes example code for referencing an element of one collection in an entry of another collection;

FIG. 14 includes example code for defining a collection having no entries;

FIG. 15A includes an example code segment 125 that implements an aggregate that supports vfpointer data members;

FIG. 15B includes code segment that implements an initialization function for SvirtualSupport;

FIG. 15C includes a code segment that illustrates modification of CCarTraits for use of the CinstanceInitializer; and FIG. 15D includes a code segment that illustrates usage of CCarTraits::initializer.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

FIG. 1 is an object model diagram illustrating a relationship between a person and the cars owned by a given person. In a typical C++ persistence model, both person 10 and car 12 would inherit from a persistence class. Both person 10 and car 12 would provide specializations of virtual methods inherited from the persistence class that could save and restore object state (attributes) to and from a persistent data stream. In addition, person 10 and car 12 would typically register factory functions with a persistence controller object. The persistence controller saves information necessary to instantiate the correct type of object upon restoration of a persistent data stream.

While a typical persistence model provides a convenient method for saving and restoring object state, it suffers from a number of performance weaknesses. First, the necessity of factory functions almost always dictates the use of dynamic allocation of objects through operator new( ). Heap management routines may be poor, and locality of reference issues may exist. Second, objects must assign attribute values read from the persistent stream. This not only takes time, but also results in excess program code. Third, pointers to objects that have yet to be created must be resolved following their creation.

A typical persistence model does provide flexibility. With such a model, object state changes can be written to a persistent stream as required. That is, object state changes can be reflected back to the persistence medium.

Instead of creating objects and saving their state to a persistent stream, consider a scheme where instantiation of objects is done once when a program starts. Object state may be modified or remains constant throughout the lifetime of the program. Such is the case in some embedded systems or where large amounts of pre-configured data exist. In this case, objects may be instantiated directly within the program Listing 1 illustrates such hard-coded persistence:

```
Listing 1 - Example of hard-coded C++ persistence.

class CPerson;
class CCar
{
public:
   CCar( char *make, char *model, CPerson &owner ) : m__make( make ),
      m__model( model ), m__owner( owner ) { }
   CCar( const CCar &from ) : m__make( from.m__make ),
   m__model( from.m__model ),
      m__owner( from.m__owner ) { }
private:
   char *m__make;
   char *m__model;
   CPerson &m__owner;
};
class CPerson
{
public:
   CPerson( char *name, unsigned long dob ): m__name( name ),
   m__dob( dob ) { }
   CPerson( const CPerson &from ) : m__name( from.m__name ),
   m__dob( from.m__dob ) { }
private:
   char *m__name;
   unsigned long m__dob;
};
CPerson people[ ] = { CPerson( "John Smith", 19602302 ),
      CPerson( "Betty Smith", 19570503 ) };
CCar cars[ ] = { CCar( "Ford", "Escort", people[0] ), CCar( "Honda",
      "Accord", people[ 1 ] ) };
```

This persistence model makes up for the performance weaknesses of the typical C++ persistence model. There is no dynamic allocation of objects; all object memory allocation occurs at compile time. The programmer also directly controls the locality of reference. That is, the programmer can group together commonly referenced data to make access more efficient. Furthermore, there are no assignments made to object attributes read from a persistent stream. All attribute assignments are done at compile time. In theory there is no excess program code. Finally, all pointer references are resolved at compile time.

A limitation of this persistence model is the inability to respond to dynamic object state changes. Object state cannot be persisted following change as objects are held in transient memory locations. In a number of applications, this is acceptable. This is especially true in embedded systems where large amounts of pre-configured data exist. The following sections describe further use of this hard-coded C++ persistence model.

The persistence model described above suggests that excess code is eliminated. Thus, with an ideal compiler the optimization of the code from Listing 1 would produce only data and no machine instructions. However, present compilers of object-oriented code, for example, the Microsoft Visual C++ compiler, do generate instructions that assign attributes to the C++ classes. For large collections of object instances, these attribute assignments cause runtime performance problems. In addition, large collections of object instances produce excess code.

The present invention provides a data persistence strategy by which excess code can be eliminated and performance enhanced. The following description sets forth various examples that are specific to Microsoft Visual C++ (versions 5.0 and 6.0). However, it will be appreciated that invention may be applied to programs developed for other C++ compilers and programs in other object-oriented languages having compilers with similar optimization problems.

FIG. 2 is a flowchart of a process for persisting data in objects in accordance with one embodiment of the invention. The process generally entails combining known programming constructs to persist object-oriented data without producing excess code. FIGS. 3–6 set forth specific example code that illustrates usage of the programming constructs relative to the invention. Thus, the code in FIGS. 3–6 is referenced and described along with FIG. 2.

At step 52, the "structure" construct of C++ is used to declare the desired data objects. An example code segment for declaring a structure is set forth below:

```
struct
   int m__a;
   int m__b;
   char *m__c;
}
myVar = { 3, -7, "Some text" };
```

The code above creates a variable called "myVar" and initializes the member variables with the values 3, -7, and a pointer to the string "Some text". The Visual C++ compiler generates only data for the structure initialization given above. Initialization of "plane old data structures" (PODS), or aggregates in C++ parlance, provides a building block for a performance-oriented, hard-coded persistence solution that eliminates excess code.

The following discussion sets forth a technique for hard-coded persistence of simple C++ classes. Simple C++ classes are defined as having no virtual functions declared either implicitly through inheritance or explicitly through the class itself FIG. 3 has a code segment that declares a SPerson structure 102. As described above, an instance of such a structure can be allocated and initialized at compile time without the generation of any machine instructions.

FIG. 4 has a code segment that declares an example CPerson class 104. In this simple class, the data members m__name, and m__dob are private and directly accessible to any member functions of CPerson. It is possible to generate an instance of CPerson given an instance of an SPerson. This generation is accomplished through the C++ static__cast operation.

Given an instance of an SPerson structure, a caller can obtain a CPerson instance by calling CPerson::convertTo( ). The Microsoft Visual C++ compilers (versions 5.0 and 6.0) generate no machine instructions when producing a call to CPerson::convertTo( ). Considering the nature of the static__ cast operation, other C++ compilers may also exhibit such behavior. Thus, a CPerson instance can be defined at compile-time where the compiler generates no machine instructions for the allocation and initialization of that CPerson instance. FIG. 5 has example code segment 106 that assigns data values to an object named myData of the SPerson structure type.

From the example code of FIGS. 3–5 it can be seen that achieving efficient hard-coded C++ persistence can be accomplished by separating a class declaration into two parts. The first part is a structure that represents the data for the class (step 52, FIG. 2). Instances of this structure can be separately instantiated and initialized (step 54). The second part is declaration of the class itself (step 56). The class must derive from the structure declaring the data members of the class. The class must not declare any data members beyond those declared in the inherited structure. The class must provide a static method by which callers can convert structure references into instances of the class itself. In compiling the program code, an instance of such a structure is allocated and initialized at compile time without the generation of any machine instructions (step 58).

It is often necessary for an object instance of one type to reference an object instance of another type. For example, in Listing 1 an instance of a CCar holds a reference to its owner.

Using the techniques of the previous section, a structure and class declaration can be established for a car as follows:

```
struct SCar
{
    char *m_make;
    char *m_model;
    SPerson *m_owner;
};
class CCar : private SCar
{
public:
    static CCar &convertTo( SCar &from )
    {
        return static_cast< CCar & >( from );
    }
    CPerson &owner( )
    {
        return CPerson::convertTo( *m_owner );
    }
};
```

It will be appreciated that SCar holds a pointer to its owner. Pointers must be used because references can't be initialized in a C++ aggregate. Furthermore, the member function CCar::owner( ) returns a reference to its owner by converting m_owner to a CPerson reference through CPerson::convertTo( ). A typical usage might be as follows:

```
{
    ...
    SPerson myData =
    {
        "John Smith",
        19620612
    }
    SCar myCarData =
    {
        "Ford",
        "F-150",
        &myData
    }
    CCar &myCar = CCar::convertTo( myCarData );
    CPerson &me = myCar.owner( );
    ...
}
```

At this point, a class supporting hard-coded C++ persistence is made of two component parts, a structure that describes class data members and the class itself. In another embodiment, a third component implements an organizational C++ class. This third C++ component, called the traits class, describes a number of fundamental characteristics of a class supporting hard-coded C++ persistence. The traits class provides a practical solution to C++ preprocessor #include problems that arise in the application of the hard-coded C++ persistence techniques described herein. The traits class also provides a convenient type-navigation ability and concise shorthand notation for describing types.

FIG. 6 has program code that implements example traits 108. The traits class consists of three public typedefs. The first typedef, "type", names the class being described by the particular traits class. The second typedef, "base", names the base structure for the class being described by the particular traits class. The third typedef, "data", serves several purposes. First, "data" names the structure that will appear in a convertTo( ) operation. Second, the "data" typedef is used by classes that hard-code references to other classes. Finally, the "data" typedef is used when allocating physical data for the class. Note that for simple C++ classes, "base" and "data" refer to the same structure. In more complex scenarios, this isn't necessarily the case.

Given the declared traits, the SCar aggregate is written to include CPersonTraits. In general all data aggregates must reference other classes through the "data" typedef of the referenced class, as demonstrated by the SCar data aggregate.

The CPerson and CCar classes are also written generically and include the addition of the typedef, "traits". From an external point of view, any class that is required to know the traits class of a particular class can do so by using the "traits" typedef. The "traits" typedef enhances type-navigation capabilities.

Usage of the traits class is described below relative to collections of classes. The types described in the traits classes are also expanded below.

The technique of hard-coded C++ persistence is often used to record data for large numbers of object instances. Listing 1 shows CPerson objects being collected into an array. The use of a collection, such as an array, is an example organizational tool for the management of large numbers of object instances. A collection provides a central location in which to find object instances.

Instead of using arrays, it is often useful to build collection classes to house object instances. Such collection classes can provide methods for searching for particular instances. Collection classes can also provide methods that allow iteration over the contents of a collection. The population of such collection classes at compile time can be especially useful to increase runtime performance.

There are two basic data elements necessary to describe a simple collection class that can be populated at compile time. The first data element is the number of instances in the collection. The second data element is a pointer to the first data-aggregate instance in an array of data-aggregate instances. Using the techniques described above, a simple structure-based collection can be declared. FIG. 7 has program code that declares an example collection 110.

SStructCollection is a template class that is based on a traits class that describes the collection. The data member, m_first, points to the first element in an array of data-aggregate instances of type CollectionTraits::collectionData. CollectionTraits::collectionData is the type of data being collected. The data member, m_size, describes the number of instances contained in the array to which m_first points.

As suggested by the preceding paragraph, the traits class for a collection must describe not only the types of the collection itself, but also the type of data being collected. Based on the techniques described above, a traits class can be formulated for a CStructCollection class inheriting from the previously described aggregate, SStructCollection, as shown by code segment 112 in FIG. 8.

The traits class can be described in terms of its constituent parts. The CStructCollectionTraits, like a traits class for a non-collection class, is templated based on the traits class of the type being collected. However, the collection itself, CStructCollection and its base aggregate, SStructCollection are templated based on the collection traits class. The reason for this distinction will become apparent later in this description.

CStructCollectionTraits also introduces an iterator type. This type hides the differences associated with traversing different types of collections. For example, some collection types may be traversed by simply incrementing a pointer. Other collection types may require more complex iteration techniques. These iteration differences are hidden by the iterator type.

FIGS. 9A and 9B include consecutive code segments 114 and 116 that implement an example collection iterator. The CCollectionIterator is used like any normal C++ pointer type. The distinction between CCollectionIterator and a normal C++ pointer type is that CCollectionIterator holds a TypeTraits::data pointer that is explicitly converted to a TypeTraits::type pointer or reference on demand. That is, incrementing a CCollectionIterator increments a pointer to TypeTraits::data and not TypeTraits::type as the two types may not be the same size.

CStructCollectionTraits introduces the concept of an initializer type. One purpose of the aggregate-based collection is to group together the static data for what are to become class instances. Before class instances are allowed to be obtained from the collection, it may be necessary to initialize these instances beyond simple data initialization. The initializer type describes how to initialize collected class instances.

In the default case, CStructCollectionTraits establishes CNullStructCollectionInitializer as the initializer. CNullStructCollectionInitializer is implemented as follows:

```
template< class TypeTraits >
class CNullStructCollectionInitializer
{
public:
    typedef TypeTraits::collection collection;
    inline CNullStructCollectionInitializer( collection::traits::data
        &collectionData )
    {
    }
    inline ~CNullStructCollectionInitializer( )
    {
    }
};
```

Given a collection of instance data, CNullStructCollectionInitializer does nothing to that data.

FIG. 10 includes example code for an initializer called CStructCollectionInitializer. Given a collection of instance data, the constructor for CStructCollectionInitializer iterates through all data instances invoking the default constructor for the class, TypeTraits::type. The default constructor is invoked through the C++ placement new( ) operator. In addition, when a CStructCollectionInitializer instance is destroyed, CStructCollectionInitializer iterates through all data instances invoking the destructor for the class, TypeTraits::type. In general CStructCollectionInitializer is useful when instance initialization is required beyond that of simply establishing instance data As an example of populating a CStructCollection, consider establishing a collection of SPerson aggregate instances as follows:

```
{
    ...
    CPersonTraits::data peopleCollection[ ] =
    {
        { "John Smith", 19602302 },
        { "Betty Smith", 19570503 }
    }
    SStructCollection< CStructCollectionTraits<
    CPersonTraits > >::data people =
    {
        sizeof( peopleCollection )/sizeof( SPerson ),
        peopleCollection
    };
    ...
}
```

From the SStructCollection data aggregate and CStructCollectionTraits class, a CStructCollection class can be defined in a generic fashion (similar to CCar and CPerson) as follows:

```
template< class CollectionTraits >
class CStructCollection : private CCollectionTraits::base
{
public:
    typedef CollectionTraits traits;
    static traits::type &convertTo( traits::data &from )
    {
        return static_cast< traits::type & >( from );
    }
    traits::iterator begin( ) const
    {
        return m_first;
    }
    traits::iterator end( ) const
    {
        return begin( ) + size( );
    }
    unsigned int size( ) const
    {
        return m_size;
    }
};
```

The CStructCollection class implements methods that return iterators describing the beginning and end of the collection. In addition, the CStructCollection class also implements a method to obtain the size of the collection. The CStructCollection class could be extended to provide other collection capabilities such as searching.

Given the SStructCollection aggregate, people, from the previous example, example code to iterate through the collection could be implemented as:

```
{
    ...
    CStructCollection< CStructCollectionTraits< CPersonTraits > >
    &allPeople =
        CStructCollection< CStructCollectionTraits< CPersonTraits> >::
```

```
                                  -continued
convertTo( people );
    for ( CStructCollection< CStructCollectionTraits< CPersonTraits> >::
      iterator i = allPeople.begin( ); i < allPeople.end( ); ++i )
    {
      // do something here
    }
    ...
}
```

From the sample code above, it will be appreciated that the template parameters make the code quite unwieldy. To express a shorthand representation for the collection type a particular type, it is useful to expand the type traits class to describe the collection type to use for a particular type. For example, CPersonTraits is declared as:

```
class CPersonTraits
{
public:
    typedef CPerson type;
    typedef SPerson data;
    typedef SPerson base;
    typedef CStructCollection< CStructCollectionTraits< CPersonTraits > >
collection;
};
```

With the addition of the "collection" typedef the sample iteration code above becomes more concise when coded as:

```
}
    ...
    CPerson::traits::collection &allPeople = CPerson::traits::collection::
                            convertTo( people );
    for ( CPerson::traits::collection::iterator i = allPeople.begin( ); i <
    allPeople.end( );
        ++i)
    {
      // do something here
    }
    ...
}
```

Turning now to another embodiment of the invention, pre-processor macros can be used to reduce the amount of code written and enhance readability. Consider again the following example of describing data for a collection of CPerson instances:

```
{
    ...
    CPersonTraits::data peopleCollection[ ] =
    {
        { "John Smith", 19602302 },
        { "Betty Smith", 19570503 }
    }
    SStructCollection< CStructCollectionTraits< CPersonTraits > >::data
    people =
    {
      sizeof( peopleCollection )/sizeof( SPerson ),
      peopleCollection
    };
    ...
}
```

While this code is straightforward to understand and write, C++ preprocessor macros can be used to reduce the amount of code written and make the collections easier to read. In addition, the macros can make collection generation foolproof.

FIG. 11 has example code 118 that uses pre-processor macros for collection generation. The macros create two variables that are invisible to a programmer using them. The first variable is CollectionName##Collection. This variable contains the actual array of instance data The second invisible variable is CollectionName##Initializer. This variable controls the initialization and destruction of the object instances contained within the collection. Together, COLLECTION_BEGIN and COLLECTION_END allow the expression of the collection, people, in a concise way as follows:

```
COLLECTION_BEGIN( CPersonTraits, people )
    { "John Smith", 19602302 },
    { "Betty Smith", 19570503 }
COLLECTION_END( CPersonTraits, people )
```

The representation of a collection and its constituent data can be made even more concise with the addition of C++ preprocessor macros that expand COLLECTION_BEGIN and COLLECTION_END for the particular type being collected. In addition, the entry of data for the collected type can be made more concise and foolproof Consider the following macros that are added to the header file of the CPersonTraits class:

```
#define PERSON_COLLECTION_BEGIN( CollectionName ) \
    COLLECTION_BEGIN( CPersonTraits, CollectionName )
#deline PERSON_ENTRY( Name, Dob ) \
    { Name, Dob },
#define PERSON_COLLECTION_END( CollectionName ) \
    COLLECTION_END( CPersonTraits, CollectionName )
The CPerson collection, people, is now expressed as follows:
PERSON_COLLECTION_BEGIN( people )
    PERSON_ENTRY( "John Smith", 19602302 )
    PERSON_ENTRY( "Betty Smith", 19570503 )
PERSON_COLLECTION_END( people )
```

It will be appreciated that the C++ preprocessor macros remove from the programmer the rote coding details of forming a collection. The macros also abstract the implementation details from the programmer. In general the addition of these macros make coding collections less burdensome. The abstraction provided by these macros also eases future maintenance.

In addition to the CStructCollectionTraits macros described above, several other macros are worth considering. The other macros support forward referencing, inter-collection referencing, and defining collections with no entries.

FIG. 12 includes example code 120 that implements forward referencing for a collection. The forward referencing is implemented using the COLLECTION_FORWARD macro.

FIG. 13 includes example code 122 for referencing an element of one collection in an entry of another collection. The entry referencing is implemented using the ENTRY_REF macro.

FIG. 14 includes example code 124 for defining a collection having no entries. The empty collection is implemented using the COLLECTION_NO_ENTRIES macro.

The preceding description has been directed to simple C++ classes, that is C++ classes having no virtual functions.

The following description continues with various embodiments of the invention relative to complex C++ classes. A complex C++ class includes a reference to a virtual function, either implicitly or explicitly.

The difficulty in performing hard-coded persistence of complex C++ classes arises from the extra data that virtual functions add to class instances. With simple C++ classes, the only class data comes from member variables declared in the data aggregates. Complex C++ classes add at least one invisible data member to a class. This invisible data member is known as the "vfpointer". The "vfpointer" is a pointer to the virtual function table for the particular class instance.

The Microsoft Visual C++ compiler physically precedes class member variables with the "vfpointer". Consider the addition of a virtual function called "display( )" to the CCar class. The addition of this member function to CCar causes a "vfpointer" to be allocated before the data member described by the SCar aggregate.

One must consider that references to a CCar object must point at the CCar "vfpointer" data member. It is not sufficient to point to the SCar aggregate. This is where the distinction between the traits class members "data" and "base" becomes important. While CCarTraits::base continues to name SCar, CCarTraits::data must somehow account for the "vfpointer" data member. At this point, the introduction of a new aggregate is in order. This new aggregate will account for "vfpointer" data members in classes that have virtual member functions.

FIG. 15A includes an example code segment 125 that implements an aggregate that supports vfpointer data members. The SVirtualSupport aggregate prefixes an input aggregate, TypeTraits::base, with an array of "N" void pointers. Classes that use multiple inheritance may require more than a single "vfpointer". This accounts for having the "vfpointer" array in SVirtualSupport. The m_initializer member is described below. Given SVirtualSupport, CCarTraits can now be written as follows:

```
class CCarTraits
{
public:
    typedef CCar type;
    typedef SVirtualSupport< CCarTraits > data;
    typedef SCar base;
};
```

It will be appreciated that classes referencing a CCar through CCarTraits::data require no modification. Such is the usefulness of the traits class as an abstraction. As an example, consider extending the CPerson class to reference a CCar. SPerson would be declared as follows:

```
struct SPerson
}
    char *m_name;
    unsigned long m_dob;
    CCarTraits::data *m_car;
};
```

With the introduction of the "vfpointer" through the SVirtualSupport aggregate, there remains one problem to resolve. The problem relates to the initialization of the "vfpointer". The "vfpointer" data area cannot be initialized at compile time; it can only be initialized through the C++ placement new( ) function. While it would be possible to replace the static_cast operation in CPerson::convertTo( ) with a placement new call, such a replacement would be excessive. That is, the "vfpointer" has to be initialized only once. Having the "vfpointer" initialized at every call to CPerson::convertTo( ) is unnecessary.

A more appropriate solution would be to initialize the "vfpointer" once. To accomplish "vfpointer" initialization, SVirtualSupport includes an m_initializer member attribute. The m_initializer attribute is a pointer to a function that calls the C++ placement new( ) operator for the particular class type. The parameter to this function is a pointer to the location where the C++ placement new( ) operator will locate the object instance.

FIG. 15B includes code segment 126 that implements an initialization function for SVirtualSupport. The new class, CInstanceInitializer, is introduced. CInstanceInitializer consists of a single static member function that invokes construction of a particular object type at a particular location specified by the "where" parameter. As long as the constructor for the particular type does no member initialization, a properly initialized object instance will exist at the location specified by the "where" parameter. This initialization includes the "vfpointer". Given the fact that the initializer invokes the class constructor, the initialization sequence provides an opportunity for further programmatic object initialization if required.

The CInstanceInitializer used by a particular type is added to the traits class for all types that have virtual methods. FIG. 15C includes code segment 128 that illustrates modification of CCarTraits for use of the CInstanceInitializer.

FIG. 15D includes code segment 130 that illustrates usage of CCarTraits: :initializer.

As the above example is for illustrative purposes, the previously defined C++ collection macros are not used. The above example is also contrived in that a single object instance is created from static data. Large collections of object instances that can be initialized en-mass illustrate the true advantage of static-data object instances.

It should also be recognized that the initialization of complex C++ classes now adds some amount of runtime code to programs utilizing hard-coded persistence. With large collections of hard-coded data, the amount of runtime code required to initialize "vfpointers" is insignificant. Furthermore, there are few performance considerations when initializing "vfpointers" as this initialization is typically done only once during program startup.

The idea of "vfpointer" initialization and static-data object instances is of little consequence and yields limited usefulness unless a class hierarchy is involved. This conclusion stems from the overall concept of virtual functions. The following description examines considerations for the hard-coded persistence of class hierarchies.

An example class hierarchy of vehicles is considered. A vehicle is defined to have a make, model, and owner. Specific types of vehicles can be cars and boats. Cars have mileage and door attributes, while boats have an hours attribute. A vehicle defines a pure virtual display( ) function. This function is implemented by the derived classes car and boat to display these differing attributes.

Based on the discussions of hard-coded persistence so far, consider the declaration of a CVehicle class. A CVehicle must derive from an aggregate that describes instance data. One consequence of the hard-coded persistence mechanism is that the data aggregate must describe the data required for all types in the class hierarchy. This data must include both persistent and transient data.

The aggregate describing the instance data for a CVehicle class and its derived classes. CCar and CBoat might be implemented as follows:

```
struct SVehicleData
{
    char *m_make;
    char *m_model;
    CPerson Traits::data *m_owner;
    union
    {
        struct
        {
            int m_miles;
            int m_doors;
        };
        int m_hours;
    };
};
```

Notice that SVehicleData includes the data for the cars and boats. This data is segregated with a union in a way that conserves space as much as possible.

In this example, SVehicleData happens to include only persistent attributes. When any class (base or derived) requires transient instance variables, these must also be factored into the data aggregate. The key here is that the data aggregate describes member data for object instances. When laying out object instance memory areas, the hard-coded persistence mechanism relies solely on the data aggregate to describe the memory requirements of object instances.

Besides instance data descriptions, polymorphic classes should also implement virtual destructors. This is not a consequence of the hard-coded persistence mechanism, but is simply good C++ programming practice. By implementing virtual destructors, the correct class destructor is guaranteed to be called.

The following description extends the concepts presented above for hard-coded persistence of simple C++ classes to collections of complex C++ classes. Structurally, collections of complex C++ classes are the same as collections of simple C++ classes. One difference arises in the area of "vfpointer" initialization. A collection of complex C++ instance data easily allows for en-mass "vfpointer" initialization.

Beyond structure, complex C++ class collections differ from those of simple C++ classes in that the underlying type of each instance in the collection may be different. That is, because simple C++ classes don't implement virtual functions, it does not make sense to have collections of heterogeneous object type instances. With complex C++ classes, it is often advantageous to have a collection of base-class entities with varying derived-type instances.

Consider the case where a collection of vehicles is required. This collection can consist of both car and boat instances. This concept is illustrated in the following code sequence:

```
{
    ...
    CVehicle::traits::data vehicleData =
    {
        { { 0 }, { "Ford", "Escort", &personCollection[ 0 ], { 37653, 2 } },
          CarTraits::initializer },
        { { 0 }, { "Glasstron", "SSV-17", &personCollection[ 0 ], { 54 } },
          CBoatTraits::initializer },
```

-continued

```
        { { 0 }, { "Honda", "Accord", &personCollection[ 0 ],
          { 54544, 4 } },
          CCarTraits::initializer },
    };
    ...
}
```

This example illustrates both car and boat data existing in a base-class collection. Again, the C++ preprocessor macros have been omitted. The advantage of such a collection is that a caller can iterate over the collection calling the virtual methods of the base class.

Before such iteration can be done, the "vfpointer" members of each instance must be initialized. Because complex C++ classes inherit from the SVirtualSupport aggregate and consequently require "vfpointer" initialization, these classes are initialized by a special initializer called CVirtualSupportCollectionInitializer. CVirtualSupportCollectionInitializer is defined as follows:

```
template< class TypeTraits >
class CVirtualSupportCollectionInitializer
{
public:
    typedef TypeTraits::collection collection;
    inline CvirtualSupportCollectionInitializer
            ( collection::traits::data &collection Data )
        :
        m_collection( collection::convertTo( collectionData ))
    {
        for ( collection::traits::iterator i = m_collection.begin( );
              i < m_collection.end( );
                  ++i)
        {
            ( *i.pointer( )->m_initializer )( i.pointer( ) );
        }
    }
    inline ~CVirtualSupportCollectionInitializer( )
    {
        for ( collection::traits::iterator i = m_collection.begin( );
              i = m_collection.end( );
                  ++i)
        {
            typedef collection::traits::collectionType collectionType;
            i->collectionType::~collectionType( );
        }
    }
private:
    collection &m_collection;
};
```

CVirtualSupportCollectionInitializer differs from CStructCollectionInitializer in how instance initialization occurs. CVirtualSupportCollectionInitializer iterates through a collection of instance data, calling the initializer for the specific type described by SVirtualSupport::m_initializer. The destructor of CVirtualSupportCollectionInitializer operates in the same manner as the destructor of CStructCollectionInitializer.

For collections of complex C++ classes, "vfpointer" initialization is not optional. Consequently, a simplified version of CStructCollectionTraits called CVirtualSupportCollectionTraits is introduced. This traits class describes the various types used in collections of complex C++ classes. CVirtualSupportCollectionTraits is similar to CStructCollectionTraits, but hard-codes the initializer type instead of making it a template parameter. CViruralSupportCollectionTraits may be defined as follows:

```
template< class TypeTraits >
class CVirtualSupportCollectionTraits
{
public:
   typedef TypeTraits::data collectionData;
   typedef TypeTraits::type collectionType;
   typedef CCollectionIterator< TypeTraits > iterator;
   typedef CStructCollection< CVirtualSupportCollectionTraits<
      TypeTraits > >
         type;
   typedef SStructCollection< CVirtualSupportCollectionTraits<
      TypeTraits > >
         base;
   typedef SStructCollection< CVirtualSupportCollectionTraits<
      TypeTraits > >
         data;
   typedef CVirtualSupportCollectionInitializer< TypeTraits > initializer;
};
```

It should be noted that the differences in the collection traits classes accounts for the differences in template parameters between collection classes and other classes supporting hard-coded persistence. Recall that CStructCollection and its data aggregate, SStructCollection is templated on a collection traits class, while other classes supporting hard-coded persistence are templated on their own traits class.

To illustrate the virtual support and collection techniques, the CVehicle, CBoat, and CCar collection example is expanded upon below. First, CVehicleTraits is expanded to include a description of the collection type for a CVehicle. Furthermore, CVehicleTraits is required to define the collection macros. Example code for the modifications is as follows:

```
class CVehicleTraits
{
public:
   typedef CVehicle type;
   typedef SVehicleData base;
   typedef SVirtualSupport< CVehicleTraits > data;
   typedef CStructCollection< CVirtualSupportCollectionTraits<
         CVehicleTraits > > collection;
};
#define VEHICLE_COLLECTION_BEGIN( CollectionName ) \
COLLECTION_BEGIN( CVehicleTraits, CollectionName)
#define VEHICLE_COLLECTION_END( CollectionName ) \
COLLECTION_END( CVehicleTraits, CollectionName)
CCarTraits and CBoatTraits, may be defined as:
class CCarTraits
{
public:
   typedef CCar type;
   typedef CVehicleTraits::data data;
   typedef CVehicle base;
   typedef CVehicleTraits::collection collection;
   typedef CInstanceInitializer< CCarTraits > initializer;
};
#define CAR_ENTRY( Make, Model, PersonRef, Miles, Doors ) \
   { { { 0 }, { Make, Model, PersonRef, { Miles, Doors } } },
      CCarTraits::initializer::initialize },
class CBoatTraits
{
public:
   typedef CBoat type;
   typedef CVehicleTraits::data data;
   typedef CVehicle base;
   typedef CVehicleTraits::collection collection;
   typedef CInstanceInitializer< CBoatTraits > Initializer;
};
#define BOAT_ENTRY( Make, Model, PersonRef, Hours ) \
   { { { 0 }, { Make, Model, PersonRef, Hours } },
      CBoatTraits::initializer::initialize },
```

It should be noted that both CCarTraits and CBoatTraits define their collection to be the same as the collection defined by CVehicleTraits. In addition, both CCarTraits and CBoatTraits define collection entry macros. The example code below illustrates these macros when used together:

```
COLLECTION_FORWARD( CPersonTraits, persons1 )
VEHICLE_COLLECTION_BEGIN( person1Vehicles )
   CAR_ENTRY( "Ford", "Probe", ENTRY_REF( persons1, 0 ),
      37532, 3 )
   CAR_ENTRY( "Toyota", "Camry", ENTRY_REF( persons1, 0 ),
      10032, 4 )
   BOAT_ENTRY( "Glastron", "SSV-17", ENTRY_REF( persons1,
      0 ), 5 )
   CAR_ENTRY( "Honda", "Accord", ENTRY_REF( persons1, 0 ),
      38837, 2 )
VEHICLE_COLLECTION_END( person1Vehicles )
VEHICLE_COLLECTION_BEGIN( person2Vehicles )
   CAR_ENTRY( "Ford", "Escort", ENTRY_REF( persons1, 1 ),
      37532, 2 )
   BOAT_ENTRY( "Glastron", "SSV-17", ENTRY_REF( persons1,
      1 ), 5 )
   CAR_ENTRY( "Honda", "Accord", ENTRY_REF( persons1, 1 ),
      38837, 4 )
VEHICLE_COLLECTION_END( person2Vehicles )
PERSON_COLLECTION_BEGIN( persons1 )
   PERSON( "John Smith", 19571129 )
   PERSON( "Betty Smith", 19601201 )
PERSON_COLLECTION_END( persons1 )
```

The simplicity of use shown by the code above demonstrates the level of abstraction achieved by the present invention. The overall complexity of the hard-coded persistence is completely hidden from the programmer's view. Among other aspects, the invention provides support classes for creating and initializing large collections of static-data objects. The use of these support classes and techniques will optimize program performance in those programs where hard-coded persistence is appropriate. Furthermore, various compilers will generate fewer overall machine instructions for data persistence.

Accordingly, the present invention provides, among other aspects, a method and apparatus for persisting object oriented data objects. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for persisting object-oriented data objects, comprising:
   defining in a source program a first structure type for storage of one or more data values;
   defining in the source program a plurality of objects of the structure type;
   initializing the objects with selected data values in the source program;
   defining in the source program a first class that derives from the structure type, the class including a static method configured to convert an object of the structure type to an instance of the class in response to a reference to the method; and allocating memory for the objects and assigning the data values to the objects at compile-time.

2. The method of claim 1, further comprising:

defining in the source program one or more traits classes, each traits class including first, second, and third public type definitions, the first type definition identifying a class described by the traits class, the second type definition identifying a base structure for the class described by the traits class, and the third type definition for identification of a structure for input to the static method of the class described by the traits class, for reference to the class described by the traits class, and for assignment of data to the class described by the traits class; and defining in the source program a second class, the second class including an attribute of the third type definition of a traits class that describes the first class.

3. The method of claim 2, further comprising:

defining in the source program a collection class that includes objects of the first class; and instantiating objects of the first class in an object of the collection class in the source program.

4. The method of claim 3, further comprising defining in the source program a collection iterator configured to traverse the objects of the first class in the collection object.

5. The method of claim 4, further comprising:

defining in the source program a second structure type that includes one or more void pointers and an input aggregate structure; and defining one or more of the traits classes with the second structure type used as the third public type definition.

6. The method of claim 5, further comprising:

defining a template class that includes an initialize method that calls a language-provided function that constructs an object of a specified type;

defining in one of the traits classes a member attribute that is a pointer to the initialize method.

7. The method of claim 4, further comprising:

defining in the source program a pre-processor macro that encapsulates the collection class; and instantiating objects of the first class in an object of the collection class in the source program by reference to the pre-processor macro.

8. The method of claim 7, further comprising defining in the source program a pre-processor macro that forward references the collection class.

9. The method of claim 7, further comprising defining in the source program a pre-processor macro that references an element of a first collection in an entry of a second collection.

10. The method of claim 7, further comprising defining in the source program a pre-processor macro that initializes a collection having no entries.

11. The method of claim 10, further comprising:

defining a template class that includes an initialize method that calls a language-provided function that constructs an object of a specified type;

defining in one of the traits classes a member attribute that is a pointer to the initialize method.

12. The method of claim 7, further comprising:

defining in the source program a second structure type that includes one or more void pointers and an input aggregate structure; and defining one or more of the traits classes with the second structure type used as the third public type definition.

13. The method of claim 12, further comprising:

defining a template class that includes an initialize method that calls a language-provided function that constructs an object of a specified type;

defining in one of the traits classes a member attribute that is a pointer to the initialize method.

14. The method of claim 4, further comprising defining an initializer class that iterates through objects in the collection class invoking a default constructor for an input class type.

15. The method of claim 2, further comprising:

defining in the source program a second structure type that includes one or more void pointers and an input aggregate structure; and defining one or more of the traits classes with the second structure type used as the third public type definition.

16. An apparatus for persisting object-oriented data objects, comprising:

means for defining in a source program a first structure type for storage of one or more data values;

means for defining in the source program a plurality of objects of the structure type;

means for initializing the objects with selected data values in the source program;

means for defining in the source program a first class that derives from the structure type, the class including a static method configured to convert an object of the structure type to an instance of the class in response to a reference to the method; and means for allocating memory for the objects and assigning the data values to the objects at compile-time.

* * * * *